United States Patent
Vinayagam et al.

(10) Patent No.: US 11,902,328 B2
(45) Date of Patent: Feb. 13, 2024

(54) NETWORK DEVICE IDENTIFICATION

(71) Applicant: Ordr Inc., Santa Clara, CA (US)

(72) Inventors: Vivekanandan Vinayagam, San Ramon, CA (US); Gnanaprakasam Pandian, Cupertino, CA (US); Sheausong Yang, Saratoga, CA (US); Vijayaraghavan Doraiswami, Cupertino, CA (US)

(73) Assignee: Ordr Inc., Santa Clara, CA (US)

( * ) Notice: Subject to any disclaimer, the term of this patent is extended or adjusted under 35 U.S.C. 154(b) by 520 days.

(21) Appl. No.: 17/097,356

(22) Filed: Nov. 13, 2020

(65) Prior Publication Data

US 2022/0159039 A1  May 19, 2022

(51) Int. Cl.
*H04L 29/06* (2006.01)
*G06N 20/00* (2019.01)
*H04L 9/40* (2022.01)

(52) U.S. Cl.
CPC ............ *H04L 63/20* (2013.01); *G06N 20/00* (2019.01); *H04L 63/1416* (2013.01)

(58) Field of Classification Search
CPC .. H04L 63/20; H04L 63/1416; H04W 12/122; H04W 12/37; H04W 12/71; G06N 20/00
See application file for complete search history.

(56) References Cited

U.S. PATENT DOCUMENTS

| | | | |
|---|---|---|---|
| 11,093,852 B2* | 8/2021 | Benson | H04W 12/065 |
| 11,240,132 B2* | 2/2022 | Zhang | H04L 63/1408 |
| 11,425,017 B2* | 8/2022 | Musa | H04L 43/0823 |
| 11,593,585 B2* | 2/2023 | Ma | G06V 20/40 |
| 2020/0250530 A1* | 8/2020 | Shen | H04L 61/5014 |
| 2020/0259729 A1* | 8/2020 | Zhang | H04W 12/122 |
| 2021/0281582 A1* | 9/2021 | Akella | H04W 12/06 |
| 2022/0038454 A1* | 2/2022 | Kuarsingh | H04L 63/20 |

FOREIGN PATENT DOCUMENTS

EP  3223485 A1 *  9/2017  ............. G06N 20/00

OTHER PUBLICATIONS

H. Noguchi, M. Kataoka and Y. Yamato, "Device Identification Based on Communication Analysis for the Internet of Things," in IEEE Access, vol. 7, pp. 52903-52912, 2019, doi: 10.1109/ACCESS. 2019.2910848. (Year: 2019).*

\* cited by examiner

*Primary Examiner* — Joseph P Hirl
*Assistant Examiner* — Thomas A Gyorfi
(74) *Attorney, Agent, or Firm* — Invoke (57) ABSTRACT

Machine learning techniques are described for analyzing information network traffic to identify different devices connected to a network. Transmitted network packets may be passively collected and analyzed. In some cases the described techniques may be used to identify distinct devices connected to a network even though the collected and analyzed packets may lack a unique device identifier, such as a media access control (MAC) identifier, corresponding to a device that originated the packets.

21 Claims, 6 Drawing Sheets

NETWORK DEVICE IDENTIFICATION

TECHNICAL FIELD

The present disclosure relates to analyzing information network communications. In particular, the present disclosure relates to analyzing communications between networks to identify devices connected to the networks.

BACKGROUND

With the advent of mobile computing devices and the integration of wireless communication technologies in most computing devices, devices may conveniently connect to local networks. This has dramatically improved the convenience with which devices may be used because a physical, wired, connection is generally not required to connect to a local network.

While seamlessly connecting to a network is convenient for device users, it has produced challenges for the organizations operating local networks. For example, information technology administrators may be unaware of the many devices that are connected to, or may connect to, a particular network under administration. The flexible and intermittent connection and disconnection of known and unknown devices to a network may present security challenges, network traffic management challenges, and bandwidth consumption management challenges.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DETECTING DEVICE TYPES BASED ON NETWORK TRANSMISSION ANALYSIS
   3.1 TRAINING A MACHINE LEARNING MODEL USING NETWORK COMMUNICATION TRAINING SETS
   3.2 APPLYING A TRAINED MACHINE LEARNING MODEL TO IDENTIFY DEVICE TYPES BASED ON NETWORK COMMUNICATIONS
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One or more embodiments include machine learning techniques for analyzing information network traffic to identify different devices connected to a network. This may be accomplished by passively collecting data packets transmitted through the network and analyzing the collected network packets. Some of the embodiments described herein may be applied to identify distinct devices connected to a network even though the collected and analyzed packets may lack a unique device identifier, such as a media access control (MAC) identifier, corresponding to a device that originated the packets.

Some of the techniques described herein may identify distinct devices using one or more trained machine learning models to identify patterns within network transmissions that can be correlated to particular devices. For example, the system may generate, using a trained machine learning model, a device profile that is based on content analyzed in a packet (as revealed upon a packet inspection), patterns of transmissions between certain network devices, and other attributes detected in transmitted data packets. A profile for a particular device may be associated (or "bound") to a device identifier that is available within a packet as a substitute for the unavailable MAC identifier. The system may then use the machine learning model and the associated device profile to attribute future transmissions to a particular device.

The embodiments described herein may be particularly useful when characterizing communications between networks, sometimes referred to as "L3" communication.

One or more embodiments described in this Specification and/or recited in the claims may not be included in this General Overview section.

2. Architectural Overview

Figure 1:
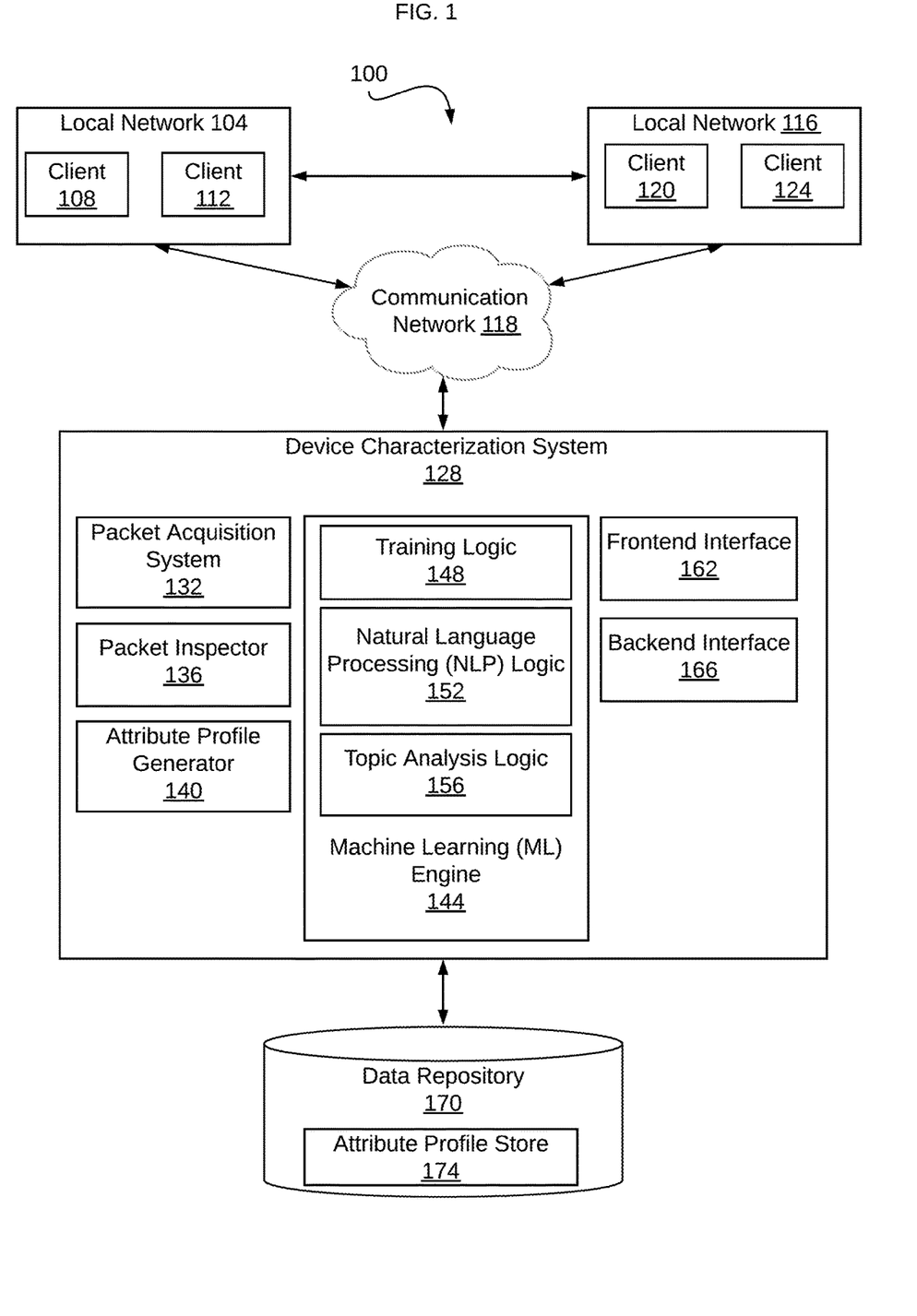
FIG. 1 illustrates a system in accordance with one or more embodiments.

FIG. 1 illustrates a system 100 in accordance with one or more embodiments. As illustrated in FIG. 1, system 100 includes local network 104, local network 116, communication network 118, device characterization system 128, and data repository 170. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Figure 2A:
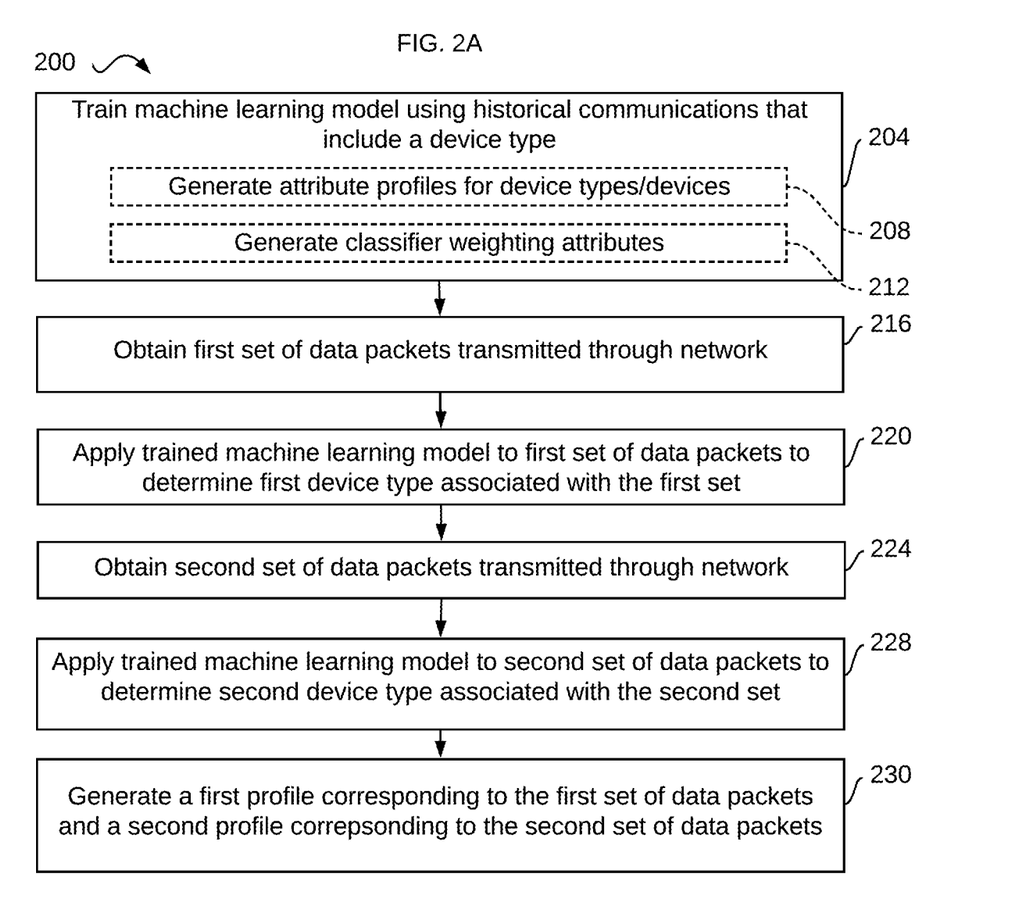
FIG. 2A illustrates an example set of operations for identifying network devices connected to a network using passive observation of inter-network traffic, in accordance with one or more embodiments.
Figure 2B:
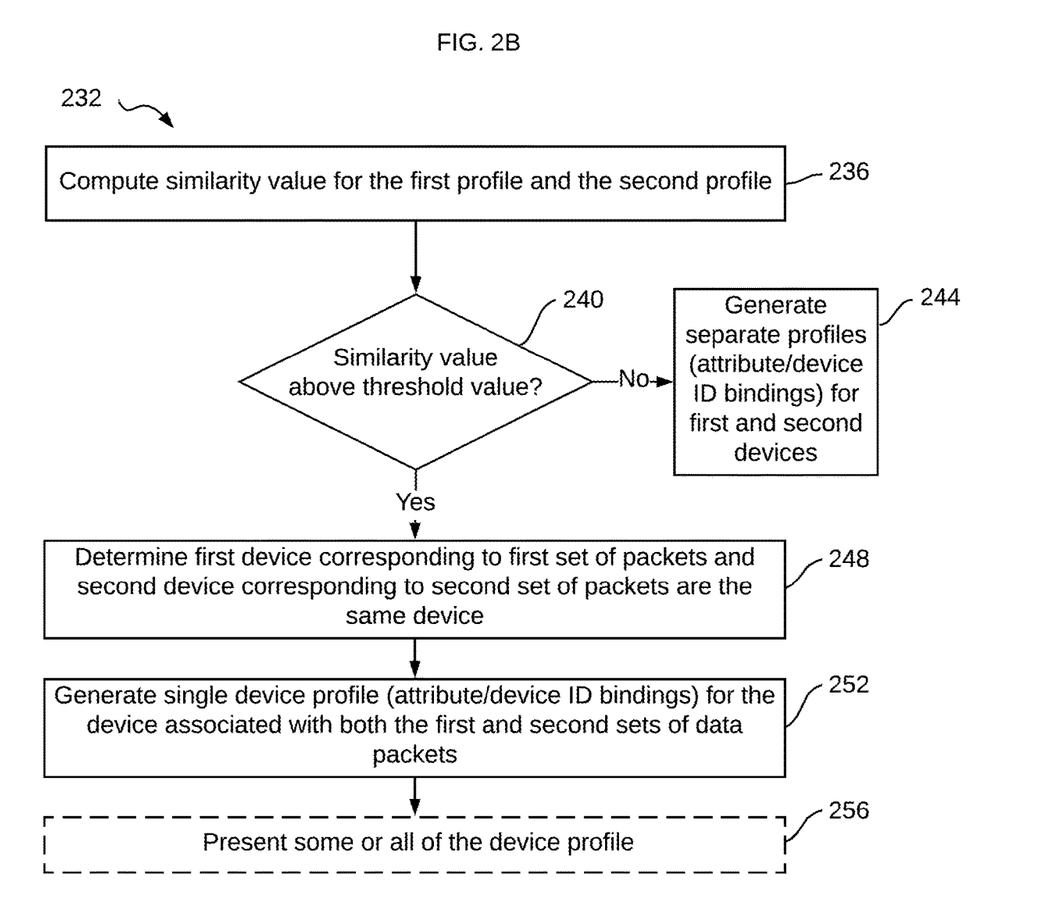
FIG. 2B illustrates operations of an example method that may be used in coordination with the method depicted in FIG. 2A, in accordance with one or more embodiments.

In one or more embodiments, the device characterization system 128 refers to hardware and/or software configured to perform operations described herein for identifying devices connected to networks by passively observing and analyzing network-to-network communications. Examples of operations for identifying devices connected to multiple networks by passively observing and analyzing network-to-network communications are described below with reference to FIGS. 2 and 3.

In an embodiment, the various components of the system 100, including the device characterization system 128 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Embodiments of the local network 104 and the local network 116 may include local area networks (LAN) or other types of similar networks. Examples of technologies used to operate the local networks 104, 116 include ethernet and Wi-Fi (e.g., wireless communications operating according IEEE 802.11 standards), among others. As illustrated in FIG. 1, local area network 104 and local area network 116 may communicate directly with one another, or may communicate with one another via the communications network 118. As described below, the communication network 118 may include a wide area network (WAN) system, such as the Internet.

The local network 104 includes clients 108, 112. The local network 116 includes clients 120, 121. Clients, such as clients 108, 112, 120, and 124 may be devices, programs, or applications that enable communications between the local networks 104 and 116. In some examples, the clients 108, 112, 120, and 124 may interact with cloud services using one or more communication protocols, such as HTTP and/or other communication protocols of the Internet Protocol (IP) suite, for example via the communications network 118. Some versions of clients 108, 112, 120, and 124 enable a human user to interact with the device characterization system 128 to identify the distinct clients (i.e., computing devices) connected to one or both of the local networks 104 and 116.

The clients 108, 112, 120, and 124 may include any one or more of a wide range of possible computing devices. Example devices include multifunction devices, such as mobile communication devices like mobile phones, laptops, tablet computers, as well as function-specific user devices. Examples of function-specific user devices (include medical devices (e.g., ultrasound scanners, X-ray machines, digital thermometers), manufacturing equipment (e.g., machine-control devices, computer controlled production equipment, CNC controlled machine tools), or other computing devices that are configured to perform specific operations, even though these operation-specific devices may include generic computing functions also found in mobile communication devices.

In still other examples, one or more of the clients 108, 112, 120, and 124 may include network appliances, such as network routers, switches, load balancers, and others. In some examples, the techniques described herein may be applied to communications between the local network 104 and the local network 116 that are mediated by corresponding network routers. As explained below, prior to transmission of a packet from an origin network, an origin network router may replace a MAC ID of the device that generated the packet with the MAC ID of the origin network router itself. This replacement enables a return transmission from a destination network to be sent back to the origin network. This, however, has the effect of obscuring an identity of the device that originated the communication. Systems that passively monitor a network to identify connected devices (e.g., for authentication, network management and/or security purposes) may lose effectiveness because inbound communications may present MAC IDs of routers and not of the origin devices. This in turn complicates efforts to detect network devices by passively monitoring network communications.

While only two local networks and four clients are shown in FIG. 1, one advantage of embodiments described herein is that the device characterization system 128 may identify distinct devices connected to a particular local network for tens, hundreds, or even thousands of clients. Furthermore, the clients may be of many different types. Without embodiments of the present disclosure, identifying many distinct devices using unobtrusive, passive network monitoring in complex environments is nearly impossible because of the sheer number of individual machines, the obfuscation of unique device identifiers (e.g., MAC ID), and the regular re-assignment of IP addresses to different machines.

The communication network 118 enables communication between one or more of the local network 104, the local network 116, and the device characterization system 128. More specifically, transmissions (e.g., data packets transmitted using a corresponding packet network transmission protocol) may be transmitted from the local network 104 via the network 118 (and clients 108, 112 therein) to the local network 116 (and clients 120, 124 therein), and vice versa. Similarly, scheduling data, diagnostic analysis, software updates, security updates, and the like may be transmitted to clients 108, 112, 120, 124 via the network 118.

Examples of the network 118 include those described below in Section 5, titled "Computer Networks and Cloud Networks." Additional embodiments and/or examples relating to computer networks are also described below in Section 5.

The device characterization system 128 is configured to passively monitor data and analyze transmissions between the local network 104 and the local network 116 via the communication network 118. The device characterization system 128 may, based on the analysis, identify distinct devices associated with each of the local networks 104, 116 even in the absence of a device inventory or a MAC ID of an origin device in the transmission.

The device characterization system 128 includes a packet acquisition system 132, a packet inspector 136, an attribute profile generator 140, a machine learning engine 144, a frontend interface 162 and a backend interface 166.

The packet acquisition system 132 interacts with the communication network 118 to passively obtain and/or analyze transmissions (e.g., packets) transmitted between the local network 104 and the local network 116 via the communication network 118.

In some examples, the packet acquisition system 132 passively monitors the communication network 118 and mirrors (e.g., copies) transmissions between the local network 104 and the local network 116. In one example, the packet acquisition system 132 may be embodied as a switch port analyzer (SPAN). A switch port analyzer may copy packets transmitted to or from one or more ports in a network. Once successfully copied, the switch port analyzer of the packet acquisition system 132 may forward the copied packets to other elements of the device characterization system 128 for analysis.

In another embodiment, the packet acquisition system 132 passively monitors the communication network 118 via a test access point (TAP) and its associated technology. A test access point is associated with a hardware configuration that copies traffic passing through ports connected to the TAP. For example, a splitter may be used to divide an optical signal transmitted through optical fiber used in a network. Regardless of the technology used, as with the switch port analyzer, the test access point may also provide copied packets to other elements of the device characterization system 128 for analysis.

The packet inspector 136 may execute a deep packet inspection on the packets provided by the packet acquisition system. The packet inspector 136 may inspect both header data and payload data of the packets transmitted between the local networks 104 and 116. Executing the deep packet inspection enables the packet inspector 136 to identify various attributes associated with the packets. These attributes, described below in more detail in the context of FIGS. 2 and 3, may be used to identify patterns in the transmissions that are then associated with a particular device. In some embodiments, the deep packet inspection may also identify within the packet a device identifier or information that may be used to identify a particular device. Examples of these attributes include patterns of communication during periods of time, associations with particular network infrastructure devices, such as consistent use of ports or consistent transmissions to and/or from particular switches, routers, and/or servers, among other attributes.

In some examples, the packet inspector 136 obtains metadata related to the transmissions (e.g., port, protocol, device descriptors) via a simple network management protocol (SNMP) "trap." The SNMP trap may obtain this metadata from the packets mirrored by the packet acquisition system 132. In some examples, the SNMP trap may obtain a device identifier that is not the MAC ID. For example, the SNMP trap may identify a device serial number or a combination of other factors that may be used to identify a device instead of the MAC ID.

The attribute profile generator 140 may receive data, in particular transmission attribute data generated by the packet inspector 136, to generate device profiles. These stored profiles may then be used to associate packets with an origin device, in some examples. The attribute profiles may be stored (e.g., in attribute profile store 174 of the data repository 170) so that additional transmissions may be conveniently compared to the stored attributes as part of identifying the devices associated with the additional transmissions.

The machine learning engine 144 may be trained to identify a device type, or even distinct devices, by analyzing attributes of a transmission (or multiple transmissions associated with one another). Once trained, the machine learning engine 144 may be applied to new "target" transmissions to identify the devices associated with the transmissions. In some examples, devices initially presumed to be different (e.g., based on a different IP address) may be determined to be the same based on the machine learning analysis of the attributes. In this case, different profiles associated with a same device may be merged or alternatively transmissions may be associated with a corresponding device profile. The machine learning engine 144 includes training logic 148, natural language processing (NLP) logic 152, and topic analysis logic 156.

In some embodiments, the training logic 148 receives training sets of historical data as input (i.e., a training corpus). Examples of historical data used as a training corpus include, but are not limited to, sets of transmissions (e.g., sets of data packets associated with communication sessions) transmitted to and/or from particular devices. The training sets of data may include various attributes of the transmissions, in corresponding headers or payloads of the transmissions, and an indication of a device type of the device(s) generating or receiving the transmissions.

In some examples, the training data sets supplied to the training logic 148 may include labels that identify various attributes of the transmissions, device types, and/or the identity of the devices associated with the transmissions. The system may use these labeled training materials to learn associations between one or more attributes, device types, and even particular devices. In this way, the labeled training materials may facilitate a machine learning analysis of a new, "target" transmission.

The training logic 148 may be in communication with a user client, such as one of the clients 108, 112, 120, or 124. A user client may include a user interface configured to enable a user to apply labels to the training data sets. Alternatively, in some embodiments, labels may be applied via a user client contemporaneously with a communication session so that the device characterization system 128 may be trained contemporaneously with a communication session. Contemporaneously labeled transmissions may also be used by the training logic 148 to train the ML engine 144.

In some embodiments, the training logic 148 is configured to identify feature values and generate feature vectors from the communications of the training corpus. The training logic 148 may, in some examples, tokenize communication attributes and/or payload data transmitted in data packets. The training logic 148 may then generate feature vectors that include a sequence of values, with each value representing a different token. In some examples, such as those in which the natural language processing (NLP) logic 152 is used to analyze payload data of a communication, feature vectors generated by the training logic 148 may include term frequency feature vectors and term-frequency/inverse document frequency feature vectors. The labels assigned to attributes, words, and phrases in the training corpus documents may then be associated with corresponding feature vectors.

The training logic 148 may append other features to the generated feature vectors. In one example, a feature vector may be represented as $[f_1, f_2, f_3, f_4]$, where $f_1$, $f_2$, $f_3$ correspond to tokens and where $f_4$ is a non-vocabulary feature. Example non-vocabulary features may include, but are not limited to, a duration of a communication session, an elapsed time of communication session, and other attributes that may be used to identify a particular device.

The natural language processing (NLP) engine 152 embodies one example of a natural language processing technique that may optionally be applied in some examples. In some examples, the NLP logic 152 may operate in cooperation with the feature vector generator of the training logic 148 to analyze training and/or target transmissions (e.g., data packets). The NLP logic 152 may generate a vocabulary from the training corpus and then generate content vectors using a topic modeling algorithm executed by the topic analysis logic 156.

In some examples, natural language processing algorithms, such as "Doc2Vec" and "Word2Vec" may be used to vectorize some types content and analyze the content using natural language processing. For example, attributes associated with a profile generated by the attribute profile generator 140 may be collected into a single file and each attribute may be considered a "word" (i.e., corresponding to a feature vector token). The NLP logic 152 may then analyze the file that contains the attributes for a particular device using a "bag of words" model that is in turn used to generate a feature vector corresponding to the profile.

The topic analysis logic 156 embodies one example of a natural language processing technique that may optionally be applied in some examples. In some examples, the topic analysis logic 156 may operate in cooperation with the NLP logic 152 and the training logic 148 and receive generated feature vectors and/or tokens that the topic analysis logic 156 analyzes to detect topics in communication payloads that may be used to identify a particular device associated with the communications. Feature vectors commonly used in topic modeling include, but are not limited to TF-IDF, or term frequency count vectors. These feature vectors may be generated by the topic analysis logic 156 based on tokens and/or a vocabulary provided by other elements of the ML engine 144 (e.g., the attribute profile file generated by the NLP logic 152). In some examples, the feature vectors generated by other elements of the ML engine 144 may be provided to the topic analysis logic 156. Examples of topic modeling algorithms include, but are not limited to, latent Dirichlet allocation (LDA) or correlated topic modeling (CTM). It will be appreciated that these are examples presented for illustration only and that other algorithms may be used.

In one or more embodiments, frontend interface 162 refers to hardware and/or software configured to facilitate communications between elements of the system 100, and between the elements of the system 100 and a user. Frontend interface 162 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of frontend interface 162 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, frontend interface 162 is specified in one or more other languages, such as Java, C, or C++.

Backend interface 166 may include an API, CLI, or other interfaces for invoking functions to execute actions. One or more of these functions may be provided through cloud services or other applications, which may be external to the system 128. For example, one or more components of system 128 may invoke an API to access information stored in data repository 170 for use as a training document for the machine learning engine 144. As another example, an API in the backend interface 166 may access communication systems used by agents and callers so as to execute real-time analysis of the audio stream and/or event stream. It will be appreciated considering these examples that the actions that are performed may vary from implementation to implementation.

In some embodiments, the system 128 may access external resources, such as cloud services. Example cloud services may include, but are not limited to, social media platforms, email services, short messaging services, enterprise management systems, verbal communication systems (e.g., internet based voice communications, text chat communications, PTSN communications systems) and other cloud applications. Backend interface 166 may serve as an API endpoint for invoking a cloud service. For example, backend interface 166 may generate outbound requests that conform to protocols ingestible by external resources. Backend interface 166 may process and translate inbound requests to allow for further processing by other components of the system 128. The backend interface 166 may store, negotiate, and/or otherwise manage authentication information for accessing external resources. Example authentication information may include, but is not limited to, digital certificates, cryptographic keys, usernames, and passwords. Backend interface 166 may include authentication information in the requests to invoke functions provided through external resources.

In one or more embodiments, a data repository 170 is any type of storage unit and/or device (e.g., a file system, database, collection of tables, or any other storage mechanism) for storing data. Further, a data repository 170 may include multiple different storage units and/or devices. The multiple different storage units and/or devices may or may not be of the same type or located at the same physical site. Further, a data repository 170 may be implemented or may execute on the same computing system as the device characterization system 128. Alternatively or additionally, a data repository 170 may be implemented or executed on a computing system separate from the device characterization system 128. A data repository 170 may be communicatively coupled to the device characterization system 128 via a direct connection or via a network (e.g., the communication network 118).

Information describing the stored attribute profiles associated with one or more identified devices may be implemented across any of components within the system 100. However, this information is illustrated within the data repository 170 for purposes of clarity and explanation.

3. Detecting Device Types Based on Network Transmission Analysis

FIGS. 2A and 2B illustrate example sets of operations for analyzing data packet transmissions to identify associated devices, in accordance with one or more embodiments. One or more operations illustrated in FIGS. 2A and 2B may be modified, rearranged, or omitted all together. Accordingly, the particular sequences of operations illustrated in FIGS. 2A and 2B should not be construed as limiting the scope of one or more embodiments.

As mentioned above, wireless connection technologies have improved the ease and convenience of connecting computing devices to communications networks. However, the ease and convenience of connecting devices to a network may also make it more challenging for information technology administrators to track and identify the devices that are connected to a network. Because some devices that may connect to a network may be small, numerous, and portable (e.g., wireless barcode scanners, mobile communication devices, wireless medical devices such as thermometers), even physical inventories of devices may not be sufficient to adequately identify devices connected to a network.

While devices are assigned a unique MAC ID, this unique identifier may be obscured in packets transmitted between networks by the process of routing a packet from one network to another.

The techniques described below include the use of a trained machine learning model. The following Section 3.1 describes techniques used to train the machine learning model. The following Section 3.2 describes techniques used to apply the model to target transmissions and identify device types originating the transmissions.

3.1 Training a Machine Learning Model Using Network Communication Training Sets

The method 200, the operations of which are illustrated in FIG. 2A (with an alternative variation of some operations illustrated in FIG. 2B), may be applied in some cases to overcome the challenges of detecting distinct devices by passively monitoring network to network transmissions.

The method 200 may begin by training a machine learning model to determine a device type and/or a device identity based on communications transmitted or received by the device (operation 204). This training may be accomplished by obtaining training data sets of historical data that corresponds to communications to and from various devices. These training data sets may then be used to train the machine learning model to associate certain patterns of communications with certain device types and/or devices. For example, the system may obtain historical data sets of communications, where each set includes (1) a set of data packets transmitted to or transmitted by a device and (2) an indication of the type of device that transmitted or received the data packets.

In some examples, an indication of a device type may include attributes such as a communication protocol used by the device, an operating system and/or operating system version, device manufacturer, among others. In one illustration, some communication protocols are specific to certain types of devices. For example, the Digital Imaging and Communications in Medicine (DICOM) communications protocol is specific to the transmission of images generated by medical imaging systems. Identification of this communication protocol may be used to associate devices that use the DICOM protocol with a medical imaging device type as part of the training. Other attributes, examples of which are described below, may then be used to further narrow the device type and/or device identity.

For example, having identified the DICOM communication protocol as an attribute, the training data may include correlations between packet payload data to further specify a device type and/or device identity. For example, packets that include X-ray image data may be associated with a medical X-ray imaging device type. Packets that include graph data with units of "mm of Hg" may be associated with a blood pressure device. Other content information may similarly be used to determine payload content. In some examples, a correlation between content and device type may be manually applied via a label in a supervised learning technique. In other examples, the correlation between payload content and device type may be identified using natural language processing, latent topic analysis, vector analysis, and other automatic techniques used in unsupervised learning. Similar approaches may be applied to other attributes so that an individual device may be identified.

In other examples, the techniques described above in the context of NLP logic 152 and topic analysis logic 156 may be applied to analyze packet payload content. Feature vectors, topics, and/or classifications may be used as attributes that are associated with particular device types or even particular devices. For example, the LDA algorithm may be applied to payload data to identify particular topics that are associated with particular devices. Similarly, natural language processing algorithms, including but not limited to Doc2Vec and Word2Vec may be used to analyze payload content of various packets. Once topics and words are analyzed, the resulting analyses may be further associated with a device type and/or one or more devices.

In still other examples, the training sets may include correlations between a device type and a communication port used to transmit and/or receive communications. For example, some devices (and/or networks) may be configured so that particular devices communicate using particular ports, whether a virtual port or a physical port. The training sets may be labeled so that transmissions from ports are correlated with certain device types and/or devices.

In one example, the various attributes identified in the training described above may be further analyzed and processed to generate attribute profiles that are associated with particular device types and/or particular devices (operation 208). By consolidating one or more attributes associated with a particular device type and/or device into corresponding device type profiles, the system may more efficiently and more accurately match the attributes detected in a target transmission to a device type. Also, the profiles may be converted to feature vectors to facilitate their use in training (and applying) the machine learning model.

In some examples, attributes profiles may be generated by identifying device types and/or individual devices by providing training data set communications, and then generating an attribute map for these device types and/or devices. In one example, a clustering algorithm may be used to generate the profile associations between attributes and device types and/or individual devices.

In some examples, a classifier may be used as part of the machine learning model training (operation 212). The classifier weighs the various attributes according to a corresponding importance or definitiveness in determining a device type. For example, a communication port attribute or a manufacturer attribute may be weighed more heavily than an operating system attribute because the communication port or manufacture may be more definitive in determining a device type and/or individual device. In other examples, the classifier may weigh various combinations of attributes according to their usefulness in determining a device type and/or individual device. For example, a combination of a particular communication port and a particular communication protocol may be more effective in determining a device type that either one alone. In this way, the classifier may weigh the combination of the particular communication port and the particular communication protocol more than simply the sum of individual (i.e., separate) occurrences of the particular communication port and the particular communication protocol. In some examples, a classifier may be applied to the attribute map generating process so that the relative importance of different attributes are reflected in the attribute map.

As described above, attributes collected for a particular device type may be consolidated into a profile. The attributes in the profile may be aggregated into a single file and then processed using LDA, Doc2Vec, and/or Word2Vec, as described above. The file thus processed may be used to generate a feature vector associated with the profile. This feature vector may then be used to train the machine learning model to recognize patterns of attributes as identifying a device type or a particular device.

Regardless of the processing used to analyze and prepare the training sets, the machine learning model may be trained using any one or more of the preceding examples (operation 204). Other types of ML models include but are not limited to linear regression, logistic regression, linear discriminant analysis, classification and regression trees, naïve Bayes, k-nearest neighbors, learning vector quantization, support vector machine, bagging and random forest, boosting, backpropagation, and/or clustering.

3.2 Applying a Trained Machine Learning Model to Identify Device Types Based on Network Communications Once the machine learning model has been trained to identify associations between device types and attributes in data transmissions, as described above in the preceding Section 3.1, the trained machine learning model may be applied to previously unanalyzed "target" transmissions. This process may begin by the system obtaining a first set of data transmissions transmitted through a network (operation 216). As described above, in some embodiments the system may be adapted for obtaining packets transmitted through a packet switched network.

In some embodiments, the system may obtain the first set of data packets via a switch port analyzer (SPAN) or a test access point (TAP), as described above. As also described above, the system may use the SPAN and/or TAP to copy ("mirror") the packets so that they may be analyzed in a way that minimizes impacts to the transmissions. In other words, the system may be configured to minimize the occurrence of dropped packets and/or latency delays caused by the execution of the method 200.

Having obtained the first set of data packets, the system may apply the machine learning model to the first set to determine a first device type associated with the first set (operation 220). In one embodiment, the operation 220 has a number of sub-operations illustrated in FIG. 3. The operations in FIG. 3 may be based on operations used to identify transmission attributes and associate the attributes with device types when training the machine learning model.

For example, the method 300 may begin by identifying attributes using some of the same techniques identified above in the operation 204. These attributes may be identified in one or both of the packet headers and/or the packet payload. For example, the system may identify one or more attributes associated with a device originating the first set of packets ("origin device") (operation 304). In some examples, the operation 304 includes identifying attributes that include, but are not limited to, an IP address, a communication protocol, a communication port, a manufacturer, and/or a device serial number associated with the origin device (operation 308). In another example, the operation 304 includes identifying an operating system, an operating system version, a computing application, a software name and/or software version associated with the origin device (operation 312). In another example, the operation 304 includes identifying a destination device IP address, a destination device communication port, and/or a time period associated with transmission of the data packets (operation 316). In another example, payload of the data packets may be analyzed to determine one or more natural language topics associated with the content in the payload and/or parameters and corresponding values transmitted in the payload (operation 320). These example attributes are grouped in FIG. 3 into operations 308, 312, 316, and 320 for convenience of explanation. It will be appreciated that any one or more of these attributes in any combination may be used by the system to identify an origin device using the techniques described herein.

Figure 3:
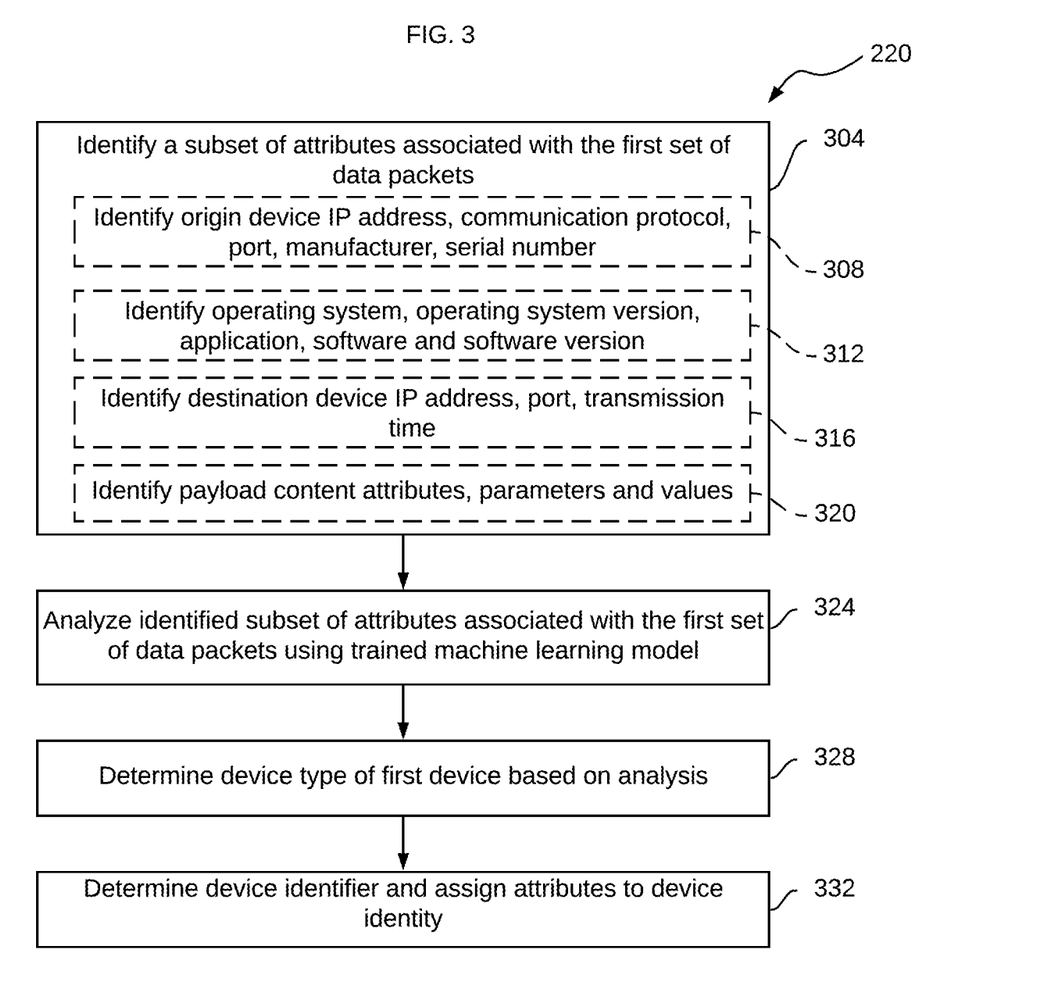
FIG. 3 illustrates an example set of operations for identifying network devices connected to a network using passive observation of inter-network traffic, in accordance with one or more embodiments.

As described above, the system may detect attributes in mirrored packets obtained by a TAP or SPAN using any one or more of a variety of techniques. For example, the system may detect attributes such as those identified in operations 308, 312, 316, and 320 using simple network management protocol (SNMP). SNMP is a common network communication protocol that enables identification of IP addresses, communication protocols, software versions, operating systems, and other attributes used in a network for addressing, transmitting, and receiving packets. In other examples, deep packet inspection (DPI), optionally in combination with SNMP, may be used to detect the attributes of operations 308, 312, 316, and 320. In still other examples, the system may execute topic analysis of packet payload using a combination of DPI and machine learning techniques described above, such as latent topic analysis.

The operation 304 detects a subset of attributes associated with the first set of data packets that may be, but need not be, smaller that the set of detectable attributes. A subset of attributes may be sufficient for situations in which the detected subset of attributes is sufficient to associate a particular device type with the first set of data packets. That is, not all attributes that are possible to be detected need to be acquired and stored in a profile for implementing the method 200. Instead, as suggested by the weights applied by the classifier, a subset of attributes may be sufficient to identify device types.

The system applies the machine learning models to the detected attributes to determine a device type (or an individual device) of the device associated with the first set of data packets (operation 324). This analysis may use some of the same algorithms and techniques used to train the machine learning model. For example, one or more of the LDA, Doc2Vec, and/or a classifier may be applied to the attributes associated with the first set of data packets. The application of one or more of trained LDA, Doc2Vec, and/or a classifier to the subset of attributes may generate a determination of the first device type (operation 328).

The analysis by the trained machine learning model may also include executing a similarity analysis (e.g., cosine similarity) to compare feature vectors corresponding to the stored profiles and a feature vector corresponding to the attributes associated with the first set of data packets. In some examples, a similarity value above a threshold value may indicate that the device or device type associated with the first set of data packets matches that of a particular stored profile.

In some embodiments, a device identifier may be detected in the first set of data packets and used as a substitute for the MAC ID to uniquely identify the associated device on the network (operation 332). In this way, patterns in detected transmissions that match the attributes associated with the identified device may be attributed to the device. This process may be referred to as "tethering" or "binding" the patterns to the device identity. Uniquely identifying a device in a network using these techniques may be used to overcome the challenges, described above, in which the number and identity of devices connected to a network are unknown.

In one example, a device identifier may be detected using an SNMP trap that extracts a device serial number from packets transmitted by the device. This device serial number, generated and assigned by the manufacturer of the device and different from the MAC ID, may be associated with the pattern of detected attributes.

In some examples, the system may issue a domain name server (DNS) probe and obtain a fully qualified domain name (FQDN) associated with the IP address of the device. When executed, the FQND may be bound to the pattern of attributes associated with the origin device of the first set of data packets. Binding a consistent and conveniently accessible unique identifier, whether a device serial number, a FQDN, or other identifier, is a useful operation in maintaining an accurate accounting of the various devices connected to a network. This is because some types of device identifiers, such as IP addresses, may be re-assigned to different devices as different device sessions are established and terminated. By binding a device identifier to the attributes associated with the device or alternatively, binding an IP address to both the device and the associated attributes, device identities may be conveniently maintained across multiple sessions even when a MAC ID is not available.

Returning to FIG. 2A, the system may obtain a second set of data packets transmitted through the network (operation 224). The second set of data packets may be analyzed by the trained machine learning model, as described above in the context of the operation 220 (operation 228). The system may then generate separate first and second profiles that correspond to the first and second set of data packets, respectively (operation 230). These profiles may include any one or more of the attributes described above that are identified by the trained machine learning model (e.g., device type).

Turning now to FIG. 2B, the system may determine whether the first and second profiles generated in response to the analysis of the trained machine learning model of the first and second sets of data packets actually correspond to the same device, and therefore should be merged into a single profile corresponding to a single device. The operations in FIG. 2B are referred to collectively as method 232.

The method 232 may begin by the system comparing the first and second profiles (generated by the trained machine learning models in operations 220 and 228) by computing a similarity value that quantifies the extent of similarity between the two profiles (operation 236). For example, a cosine similarity value may be computed from feature vector representations of the profiles. The similarity value may be based on a similarity between any one or more of the profile attributes, which in some cases may be weighted according to relevance. For example, device type may be weighted more than other attributes given that devices of different types are highly unlikely to be the same device.

If the similarity value is below the threshold value, the system may generate separate bindings between a first device identifier and the first device attributes, and a second device identifier and the second device attributes (operation 244). These bindings may then be used to identify these different devices as they connect to, and operate in communication with, a network.

However, if the similarity value is above the threshold value, then the system may determine that the first and second devices are the same (operation 248). As indicated above, example attributes contributing to a similarity value above the threshold may include, for example a device type shared by the first device and the second device, a particular type of communication protocol shared by the first and second set of packets, and/or payload data of the data packets in both the first and second sets related to similar information, among other examples. One illustration of a subset of these examples is that of both the first and second set of data packets employing the DICOM communication protocol. The system may determine, via a deep packet inspection and machine learning analysis, that both the first and second set of data packets describe blood pressure measurements. The combination of the protocol and the similarity in payload would contribute to a higher similarity value.

Determining whether the first and second devices are the same may be performed as a precursor to completing the binding of an attribute pattern to a device identifier. In some examples, the unique identity of the first and second devices may be determine based on a device serial number or other unique identifier. However, this type of uniquely identifying information is not always conveniently extractable.

In the absence of a single identifier or attribute that distinguishes the devices, the system may use the trained machine learning model to determine whether the attributes of the first set of data packets and the second set of data packets are likely to correspond to a same device. In some examples, analogous to the operation 316 related to the training of the machine learning models, the system may identify a first transmission period associated with the transmission of the first set of data packets and a second transmission period associated with the transmission of the second set of data packets. If the system identifies these first and second transmission periods as overlapping, this attribute may be a factor in determining that the devices are different devices. That is, the system may assume the devices are different because it is unlikely that the same device will simultaneously transmit data using different attribute patterns. However, if the system identifies these time periods as distinct from one another and not overlapping, then the system may determine (again, based on a combination of other attributes) that the first device and the second device may be the same.

In another example, attribute values may be used to determine whether the first device and the second device are the same. For example, even for devices of the same type, some attribute values detected in data packets will vary on a device by device basis. Different devices of the same type may communicate via different virtualized ports or communicate with different servers (or server ports) or use different versions of the same operating system or software. These differences present in data packets transmitted by the different devices of the same type may be identified by a similarity analysis using vector representations of the attributes. Regardless of the technique, these differences in attribute values may be used to distinguish between different devices of the same type even in the absence of a unique identifier.

In some examples, attribute values may be used to generate a first set of attribute values and a second set of attribute values that are based on attributes of the first and second sets of data packets respectively. Attribute values may be extracted from the data packets and represented as feature vectors to enable a convenient comparison of the attribute values between the first and second sets of data packets. If a similarity score of the attribute values is above a threshold, then the system may assume that the first and second devices corresponding to the first and second sets of data packets are actually the same.

For examples in which identifiers (e.g., device serial numbers) or machine learning model analyzed attribute patterns indicate that the first device is different from the second device, separate attribute and device ID bindings are generated as described above in the context of the operation 244. In other words, different instances of the same device type are created in the system where each instance of the device type is associated with a different identifier/attribute binding.

In some examples, subsequent machine learning analysis of data packets corresponding to these bindings may actually indicate that the first device and the second device are the same device. In this situation, the different instances are merged and a single device identifier is selected for binding to the merged attribute profile.

In some examples, an IP address attribute may be identified as the same between the first set of data packets and the second set of data packets. This may occur when an IP address is reassigned from a first device to a second device upon termination of a first session and the initiation of a second session. In this case, the change may be detected by a change in the attribute values or other behaviors. When this situation occurs, the system may use DPI to detect a device serial number, or submit a DNS probe to obtain an FQDN. Upon determining that the IP address has been reassigned to a device that does not match the device type or identity in a stored profile, the system may force reassignment of the IP address consistent with a stored profile. An alternative of this situation is that a detected attribute pattern is detected for a device that matches a stored profile with the exception of the IP address. As with the prior case, the system may presume that the IP address has been assigned to a new device and force reassignment of the IP address from the new device to maintain profile consistency.

Upon determining that the first and second devices are the same, the system then may merge a first profile corresponding to the first device (and the first set of packets) with a second profile corresponding to the second device (and the second set of packets) into a single device profile (operation 252).

The system may then optionally present some or all of the device profile (operation 256).

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
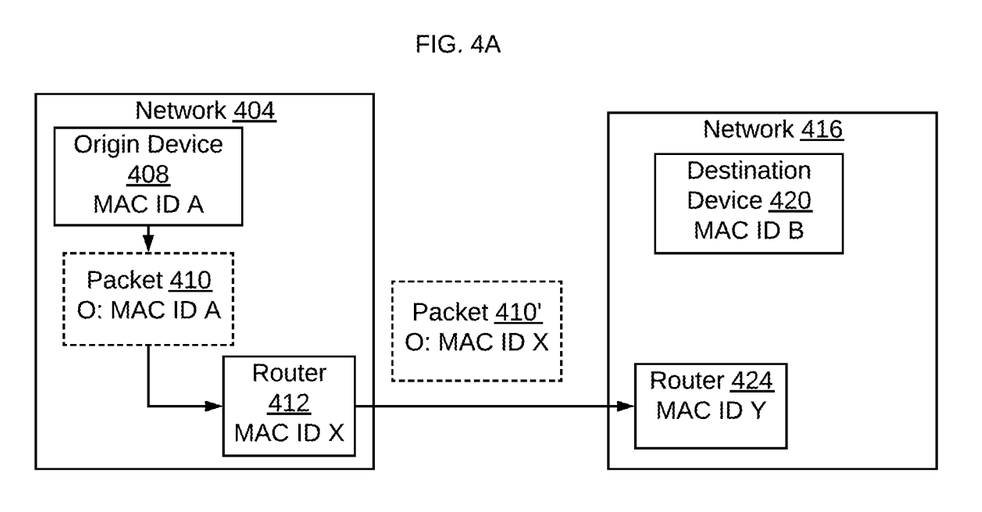
FIGS. 4A and 4B schematically illustrate an example embodiment of the operations shown in FIGS. 2A and 2B, in accordance with an embodiment.
Figure 4B:
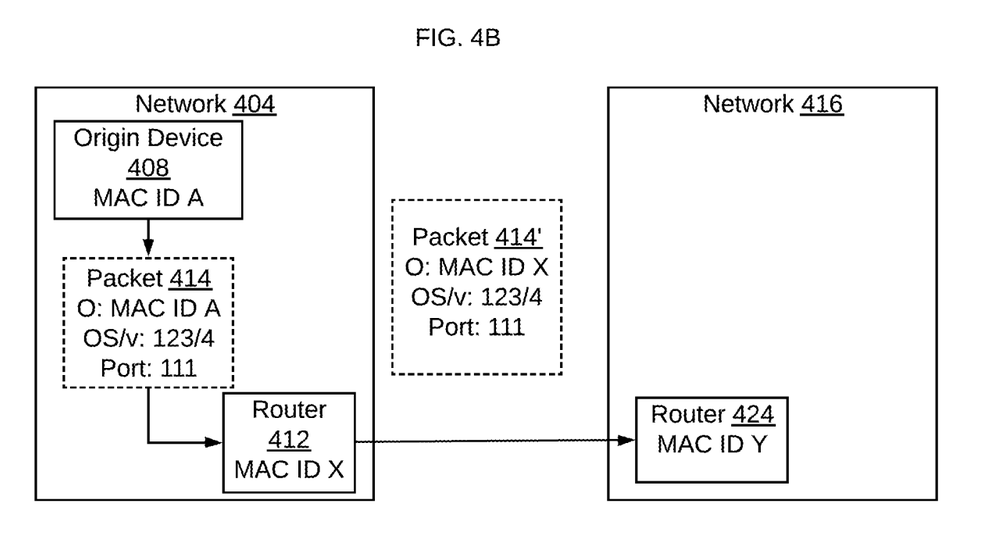

FIGS. 4A and 4B schematically illustrate an embodiment of the present disclosure in which an origin device MAC ID is obscured by a router upon transmission of a packet from one network to another network.

Turning first to FIG. 4A, an origin device 408 of a network 404 is shown as transmitting a packet 410 from the network 404 to a separate network 416 via a router 412. The origin device 410 is associated with a MAC ID "A" and the router 412 is associated with a MAC ID "X." After the packet 410 is transmitted to the router 412 by the origin device 408, the router 412 replaces the origin device MAC ID "A" with the router 412 MAC ID "X." This is illustrated in the packet 410' shown traversing a communication link between the network 404 and the network 416.

As described above, passive observation of the packet 410' is unable to identify that the origin device 408 is connected to the network 404 using MAC ID alone.

FIG. 4B illustrates an embodiment of the present disclosure in which attributes are used to associate the packet 414 with an identified device connected to the network 404. As shown, systems of the present disclosure detect within a packet 414 a combination of attributes. In this example, simplified for clarity of illustration, the packet 414 is detected to include an operating system identifier "123" with a version number of "4." The system also detects transmission port attribute of port "111." Turning to the packet 414' transmitted from the network 404 to the network 416, these same attributes are still detectable even though the MAC ID in the packet has changed to that of the router 412 (i.e., MAC ID 'X'). Because the system detects the attributes in the packet 414', the system may determine that the origin device 408 is communicating with the network 404 based on the correlation of the attributes with the origin device 408.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
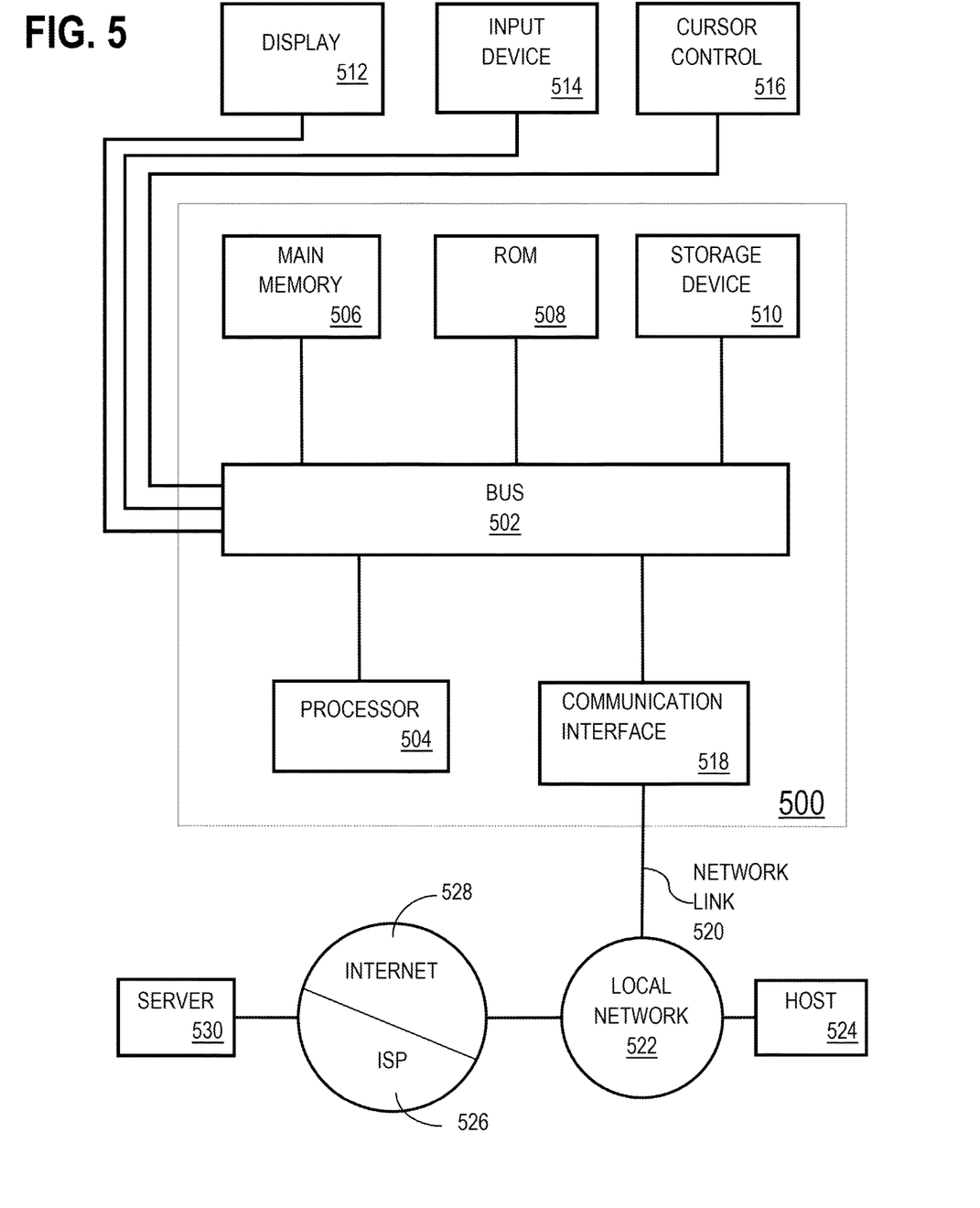
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   training a machine learning model to determine a device type of a device based on communications transmitted by the device and/or communications received by the device, the training comprising:
      obtaining training data sets of historical data, each training data set of historical data comprising:
         a set of communications transmitted to or transmitted by a particular device;
         a device type of the particular device;
      training the machine learning model based on the training data sets;
   obtaining a first plurality of data packets transmitted within a first communication session corresponding to a first device on a network;
   applying the machine learning model to the first plurality of data packets to determine a first device type corresponding to the first device;
   generating a first device profile corresponding to the first device of the first device type, wherein the first device profile is associated with a first device identifier;
   obtaining a second plurality of data packets transmitted within a second communication session corresponding to a second device on the network;
   applying the machine learning model to the second plurality of data packets to determine a second device type corresponding to the second device;
   generating a second device profile corresponding to the second device of the second device type, wherein the second device profile is associated with a second device identifier that is different from the first device identifier;
   responsive at least to determining that the first device type and the second device type are identical, determining that the first device is the same as the second device;
   responsive to determining that the first device and the second device are the same device:
   merging the first device profile and the second device profile into a single device profile based on the first plurality of data packets and the second plurality of data packets, wherein the single device profile is associated with the first device identifier and not associated with the second device identifier; and
   presenting at least a portion of the single device profile.

2. The media of claim 1, wherein determining that the first device and the second device are the same device is further responsive to determining: (a) the first plurality of data packets were transmitted during a first period of time, (b) the second plurality of data packets were transmitted during a second period of time, and (c) the first period of time and the second period of time are non-overlapping periods of time.

3. The media of claim 1, wherein determining that the first device and the second device are the same device is further responsive to determining: the first plurality of data packets and the second plurality of data packets reference a same device serial number.

4. The media of claim 1, wherein the operations further comprise:
   computing a first set of values, for the first device, for a particular set of device attributes based on the first plurality of data packets;
   computing a second set of values, for the second device, for the particular set of device attributes based on the second plurality of data packets;

computing a first similarity score for the first device and the second device based on the first set of values and the second set of values; and wherein determining that the first device is the same as the second device is further responsive to determining that the first similarity score meets a threshold similarity criteria.

5. The media of claim 4, wherein the determining operation further comprises:

computing a third set of values, for the first device, for the particular set of device attributes based on a set of historical device attributes for the first device;

computing a second similarity score between the first set of values for the first device and the set of historical values for the first device;

computing a third similarity score between the second set of values for the second device and the set of historical values for the first device; and determining that the first device is the same as the second device is further responsive to determining that the second and third similarity scores meets the threshold similarity criteria.

6. The media of claim 1, wherein the first device and the second device are determined to be the same device even though the first plurality of packets identify a first IP address for the first device that is different than a second IP address identified for the second device in the second plurality of packets.

7. The media of claim 1, wherein the first device identifier is a first fully qualified domain name (FQDN) associated with a first Internet protocol (IP) address of the first device, and the second device identifier is a FQDN associated with a second IP address of the second device.

8. The media of claim 1, wherein determining that the first device is the same as the second device comprises performing deep packet inspection to determine that the first set of data packets and the second set of data packets comprise similar payloads.

9. The media of claim 1, wherein determining that the first device is the same as the second device comprises determining that the first set of data packets and the second set of data packets employ a same transmission protocol.

10. A method comprising:

training a machine learning model to determine a device type of a device based on communications transmitted by the device and/or communications received by the device, the training comprising:

obtaining training data sets of historical data, each training data set of historical data comprising:
a set of communications transmitted to or transmitted by a particular device;
a device type of the particular device;
training the machine learning model based on the training data sets;

obtaining a first plurality of data packets transmitted within a first communication session corresponding to a first device on a network;

applying the machine learning model to the first plurality of data packets to determine a first device type corresponding to the first device;

generating a first device profile corresponding to the first device of the first device type, wherein the first device profile is associated with a first device identifier;

obtaining a second plurality of data packets transmitted within a second communication session corresponding to a second device on the network;

applying the machine learning model to the second plurality of data packets to determine a second device type corresponding to the second device;

generating a second device profile corresponding to the second device of the second device type, wherein the second device profile is associated with a second device identifier that is different from the first device identifier;

responsive at least to determining that the first device type and the second device type are identical, determining that the first device is the same as the second device;

responsive to determining that the first device and the second device are the same device:

merging the first device profile and the second device profile into a single device profile based on the first plurality of data packets and the second plurality of data packets, wherein the single device profile is associated with the first device identifier and not associated with the second device identifier; and presenting at least a portion of the single device profile.

11. The method of claim 10, wherein determining that the first device and the second device are the same device is further responsive to determining: (a) the first plurality of data packets were transmitted during a first period of time, (b) the second plurality of data packets were transmitted during a second period of time, and (c) the first period of time and the second period of time are non-overlapping periods of time.

12. The method of claim 10, wherein determining that the first device and the second device are the same device is further responsive to determining: the first plurality of data packets and the second plurality of data packets reference a same device serial number.

13. The method of claim 10, wherein the operations further comprise:

computing a first set of values, for the first device, for a particular set of device attributes based on the first plurality of data packets;

computing a second set of values, for the second device, for the particular set of device attributes based on the second plurality of data packets;

computing a first similarity score for the first device and the second device based on the first set of values and the second set of values; and wherein determining that the first device is the same as the second device is further responsive to determining that the first similarity score meets a threshold similarity criteria.

14. The method of claim 13, wherein the determining operation further comprises:

computing a third set of values, for the first device, for the particular set of device attributes based on a set of historical device attributes for the first device;

computing a second similarity score between the first set of values for the first device and the set of historical values for the first device;

computing a third similarity score between the second set of values for the second device and the set of historical values for the first device; and determining that the first device is the same as the second device is further responsive to determining that the second and third similarity scores meets the threshold similarity criteria.

15. The method of claim 10, wherein the first device and the second device are determined to be the same device even though the first plurality of packets identify a first IP address for the first device that is different than a second IP address identified for the second device in the second plurality of packets.

16. A system comprising:
at least one device including a hardware processor;
the system being configured to perform operations comprising:
training a machine learning model to determine a device type of a device based on communications transmitted by the device and/or communications received by the device, the training comprising:
obtaining training data sets of historical data, each training data set of historical data comprising:
a set of communications transmitted to or transmitted by a particular device;
a device type of the particular device;
training the machine learning model based on the training data sets;
obtaining a first plurality of data packets transmitted within a first communication session corresponding to a first device on a network;
applying the machine learning model to the first plurality of data packets to determine a first device type corresponding to the first device;
generating a first device profile corresponding to the first device of the first device type, wherein the first device profile is associated with a first device identifier;
obtaining a second plurality of data packets transmitted within a second communication session corresponding to a second device on the network;
applying the machine learning model to the second plurality of data packets to determine a second device type corresponding to the second device;
generating a second device profile corresponding to the second device of the second device type, wherein the second device profile is associated with a second device identifier that is different from the first device identifier;
responsive at least to determining that the first device type and the second device type are identical, determining that the first device is the same as the second device;
responsive to determining that the first device and the second device are the same device:
merging the first device profile and the second device profile into a single device profile based on the first plurality of data packets and the second plurality of data packets, wherein the single device profile is associated with the first device identifier and not associated with the second device identifier; and
presenting at least a portion of the single device profile.

17. The system of claim 16, wherein determining that the first device and the second device are the same device is further responsive to determining: (a) the first plurality of data packets were transmitted during a first period of time, (b) the second plurality of data packets were transmitted during a second period of time, and (c) the first period of time and the second period of time are non-overlapping periods of time.

18. The system of claim 16, wherein determining that the first device and the second device are the same device is further responsive to determining: the first plurality of data packets and the second plurality of data packets reference a same device serial number.

19. The system of claim 16, wherein the operations further comprise:
computing a first set of values, for the first device, for a particular set of device attributes based on the first plurality of data packets;
computing a second set of values, for the second device, for the particular set of device attributes based on the second plurality of data packets;
computing a first similarity score for the first device and the second device based on the first set of values and the second set of values; and
wherein determining that the first device is the same as the second device is further responsive to determining that the first similarity score meets a threshold similarity criteria.

20. The system of claim 19, wherein the determining operation further comprises:
computing a third set of values, for the first device, for the particular set of device attributes based on a set of historical device attributes for the first device;
computing a second similarity score between the first set of values for the first device and the set of historical values for the first device;
computing a third similarity score between the second set of values for the second device and the set of historical values for the first device; and
determining that the first device is the same as the second device is further responsive to determining that the second and third similarity scores meets the threshold similarity criteria.

21. The system of claim 16, wherein the first device and the second device are determined to be the same device even though the first plurality of packets identify a first IP address for the first device that is different than a second IP address identified for the second device in the second plurality of packets.

* * * * *